United States Patent [19]
White, Jr. et al.

[11] Patent Number: 6,142,509
[45] Date of Patent: Nov. 7, 2000

[54] FASTENER STRUCTURE FOR A VEHICLE OCCUPANT PROTECTION APPARATUS INCLUDING AN INFLATABLE CURTAIN

[75] Inventors: Michael James White, Jr., Shelby Township, Mich.; Yorrick Legg, Basildon; Gary Suggate, Biceser, both of United Kingdom

[73] Assignees: TRW Vehicle Safety Systems Inc., Lyndhurst, Ohio; TRW Automotive Safety Systems Ltd., Durham, United Kingdom

[21] Appl. No.: 09/245,621

[22] Filed: Feb. 5, 1999

[51] Int. Cl.[7] ................................... B60R 21/22
[52] U.S. Cl. .................... 280/730.2; 280/728.2
[58] Field of Search ............... 280/730.1, 730.2, 280/728.1, 728.2, 732

[56] References Cited

U.S. PATENT DOCUMENTS

| | | | |
|---|---|---|---|
| 2,806,737 | 9/1957 | Maxwell | 280/730.1 |
| 5,265,903 | 11/1993 | Kuretake et al. | 280/730.2 |
| 5,540,459 | 7/1996 | Daniel | 280/730.2 |
| 5,791,683 | 8/1998 | Shibata et al. | 280/730.2 |

*Primary Examiner*—Lanna Mai
*Assistant Examiner*—Lynda Jasmin
*Attorney, Agent, or Firm*—Tarolli, Sundheim, Covell, Tummino & Szabo L.L.P.

[57] ABSTRACT

An apparatus (10) includes a relatively rigid vehicle part (22) and a housing (50). The housing (50) contains an inflatable vehicle occupant protection device (12) at a location between the vehicle part (22) and a vehicle occupant compartment (17). A wall (54) of the housing (50) is located adjacent to the vehicle occupant compartment (17). The apparatus (10) further includes a fastener structure (70). The fastener structure (70) extends from the vehicle part (22) to the housing wall (54). The fastener structure (70) restrains movement of the housing wall (54) away from the vehicle part (22) under the influence of inflation fluid pressure forces applied by the protection device (12) upon inflation of the protection device (12). The fastener structure (70) is configured to collapse toward the vehicle part (22) under the influence of crash forces applied by a vehicle occupant.

10 Claims, 2 Drawing Sheets

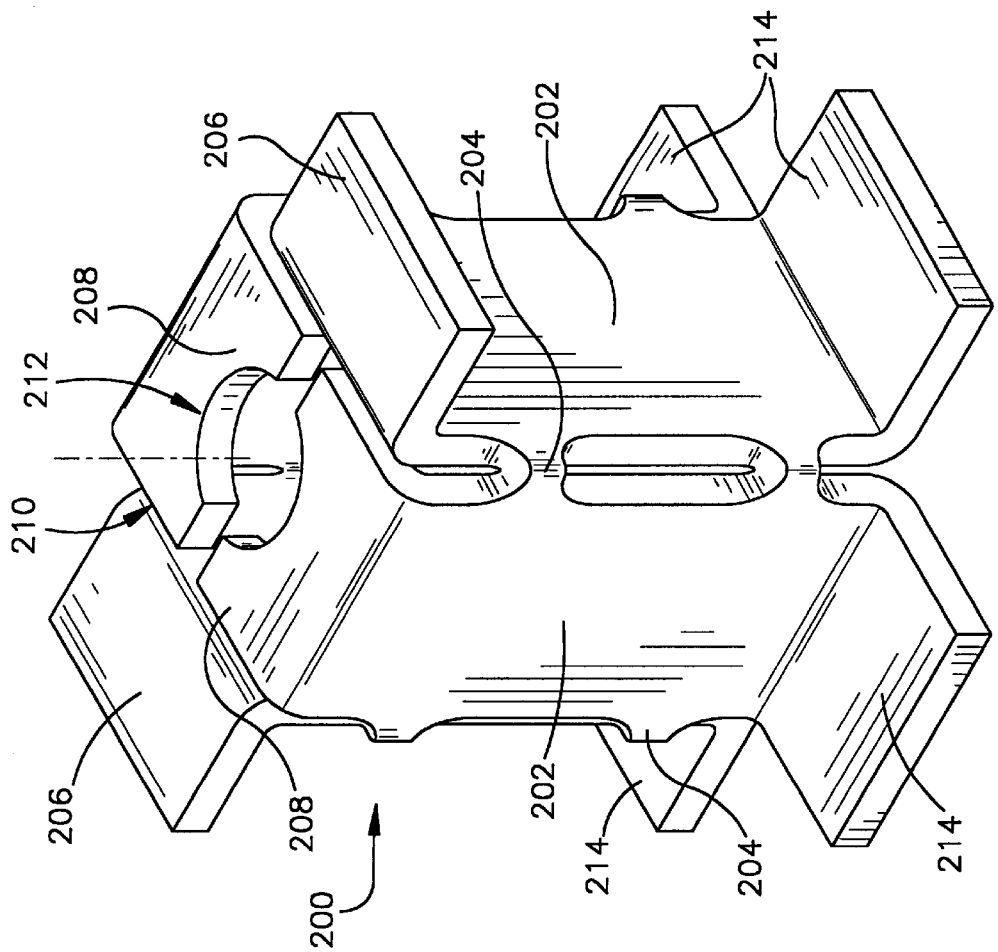
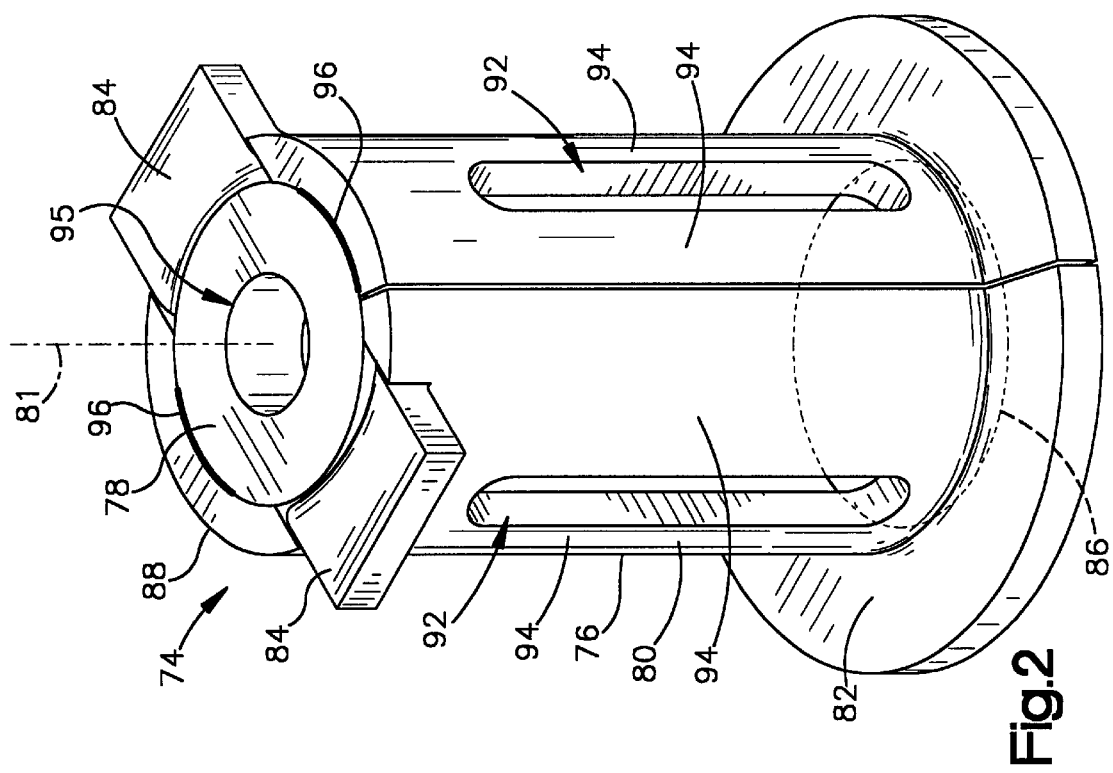

FASTENER STRUCTURE FOR A VEHICLE OCCUPANT PROTECTION APPARATUS INCLUDING AN INFLATABLE CURTAIN

FIELD OF THE INVENTION

The present invention relates to a fastener structure for mounting an inflatable vehicle occupant protection device in a vehicle, and particularly relates to a fastener structure for a housing containing an inflatable curtain.

BACKGROUND OF THE INVENTION

Vehicle crash forces may tend to move an occupant of a vehicle toward a vehicle window. For example, side impact crash forces and rollover crash forces may tend to move a vehicle occupant toward a window at the side of the vehicle. Front impact and rear impact crash forces may tend to move an occupant of a front seat toward the windshield, and may tend to move an occupant of a rear seat toward the rear window. Therefore, a vehicle may be equipped with a curtain for restraining movement of an occupant toward a window under the influence of vehicle crash forces. Such a curtain may comprise an inflatable structure which is stored in a folded, uninflated condition. The inflatable curtain is part of an apparatus that may further include a housing in which the curtain is stored. The housing is typically located within the vehicle roof structure above the corresponding window.

SUMMARY OF THE INVENTION

In accordance with the present invention, an apparatus includes a relatively rigid vehicle part and a housing. The housing contains an inflatable vehicle occupant protection device at a location between the vehicle part and a vehicle occupant compartment. A wall of the housing is located adjacent to the vehicle occupant compartment.

The apparatus further includes a fastener structure which extends from the vehicle part to the housing wall. The fastener structure restrains movement of the housing wall away from the vehicle part under the influence of inflation fluid pressure forces applied by the protection device upon inflation of the protection device. Additionally, the fastener structure is configured to collapse toward the vehicle part under the influence of crash forces applied by a vehicle occupant.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 2 is an isometric view of a part of the apparatus of FIG. 1; and

FIG. 3 is an isometric view of a part of an apparatus comprising a second embodiment of the present invention.

DESCRIPTION OF PREFERRED EMBODIMENTS

Figure 1:
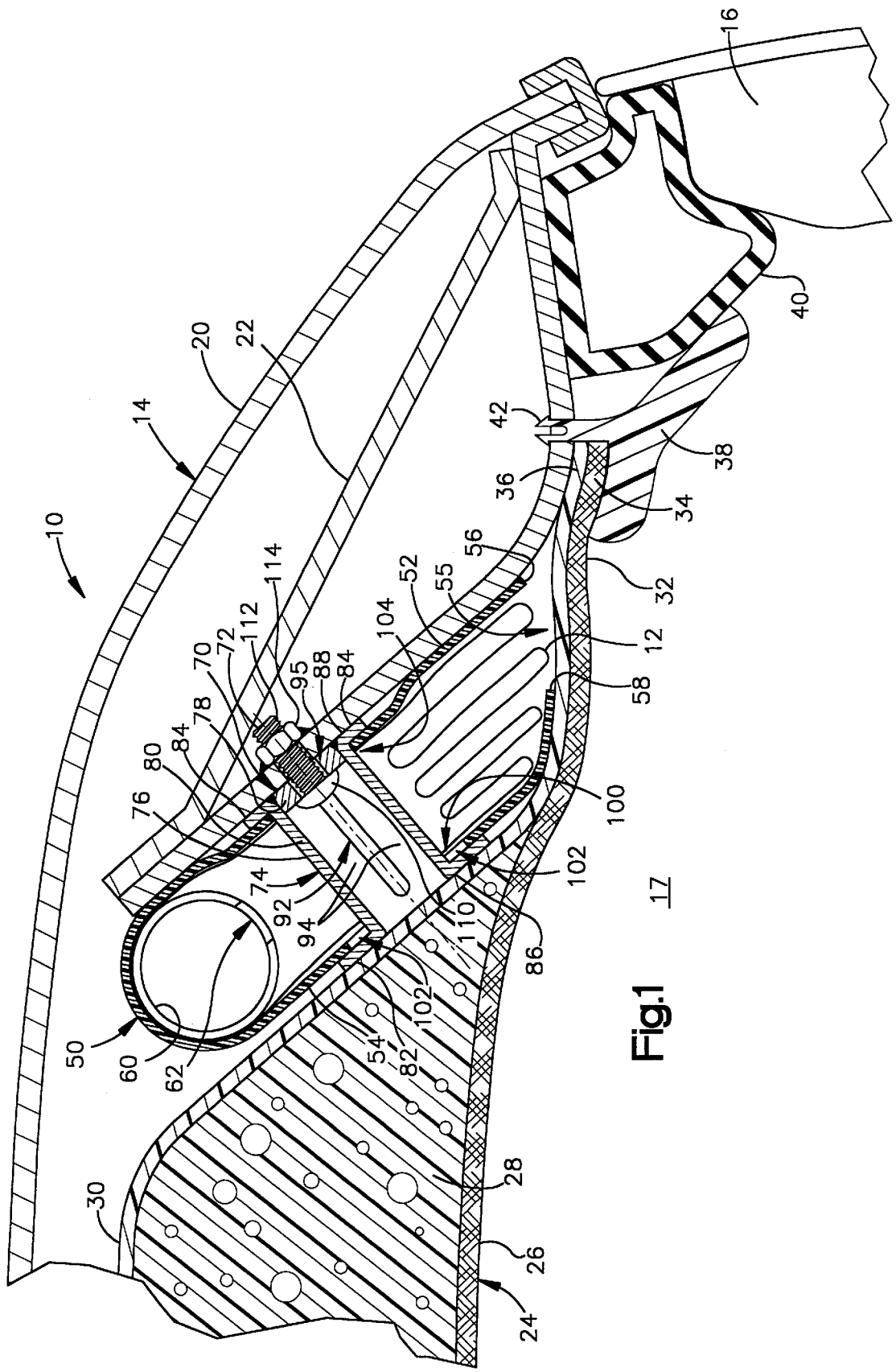
FIG. 1 is a sectional view of an apparatus comprising a first embodiment of the present invention.

An apparatus 10 comprising a first embodiment of the present invention is shown in FIG. 1. The apparatus 10 includes a vehicle occupant protection device 12 (shown schematically) which is known as a side curtain. As shown in FIG. 1, the side curtain 12 is stored in a vehicle roof structure 14 near a door 16 at the side of the vehicle. In accordance with the present invention, the side curtain 12 is an inflatable device which is stored in the roof structure 14 in a folded, uninflated condition, as shown schematically in FIG. 1. When the side curtain 12 is inflated, it is unfolded and deployed from the roof structure 14 into the occupant compartment 17. The side curtain 12 is then interposed between a vehicle occupant and the door 16 to help restrain movement of the occupant in a direction outward of a window (not shown) in the door 16 under the influence of vehicle crash forces.

As shown partially in FIG. 1, the roof structure 14 has rigid structural metal parts including a roof panel 20 and a roof rail 22. The roof rail 22 extends around the periphery of the roof panel 20 and has a generally triangular cross-sectional configuration. The roof structure 14 further includes a head liner 24 which extends over the occupant compartment 17 to conceal the roof panel 20 and the roof rail 22 from view.

The head liner 24 in the first embodiment of the invention has an outer layer 26 on a compressively deflectable base 28. The outer layer 26 is preferably formed of fabric. The base 28 is preferably formed of elastomeric foam. The head liner 24 further has a substrate layer 30 which is preferably formed of plastic. A peripheral edge portion 32 of the head liner 24 is defined by overlapping peripheral edge portions 34 and 36 of the outer layer 26 and the substrate layer 30, respectively.

A moulding strip 38 is mounted on the roof rail 22 beside a seal 40 for the door 16. The edge portion 32 of the head liner 24 is clamped between the moulding strip 38 and the roof rail 22. Although the moulding strip 38 in the preferred embodiment of the invention is connected to the roof rail 22 by locking tab portions 42 of the moulding strip 38, any other suitable fastening structures could be used as alternatives. In each case, the moulding strip 38 is fastened to the roof rail 22 tightly enough for the edge portion 32 of the head liner 24 to remain clamped firmly between the moulding strip 38 and the roof rail 22 during ordinary vehicle operating conditions.

The side curtain 12 is contained in a plastic housing 50. In the first embodiment of the present invention, the housing 50 is a trough-shaped structure extending along the roof rail 22 above the door 16. An inner side wall 52 of the housing 50 is located adjacent to the roof rail 22. An opposed outer side wall 54 of the housing 50 is spaced from the roof rail 22. The housing 50 is inclined such that the outer side wall 54 is located generally beneath the inner side wall 52. The outer side wall 54 is thus located adjacent to the vehicle occupant compartment 17. A deployment opening 55 in the housing 50 is defined by and between lower edges 56 and 58 of the side walls 52 and 54.

A conduit 60 extends into the side curtain 12 to communicate a source of inflation fluid (not shown) with the side curtain 12. The source of inflation fluid is actuated in a known manner when the vehicle experiences a crash condition that meets or exceeds a specified threshold level. Inflation fluid is then directed into the side curtain 12 through a plurality of outlet openings 62 that are spaced apart along the conduit 60.

As the inflation fluid begins to inflate the side curtain 12, it moves the side curtain 12 downward through the deployment opening 55 and forcefully against the adjacent edge portion 32 of the head liner 24. The force of the inflation fluid pressure in the side curtain 12 pulls the edge portion 32 of the head liner 24 outward from between the moulding strip 38 and the roof rail 22. As the inflation fluid continues to inflate the side curtain 12, it moves the side curtain 12 further downward past the moulding strip 38 and into the occupant compartment 17 toward the door 16.

The housing 50 is fastened to the roof rail 22 by a plurality of fastener structures 70, one of which is shown in FIG. 1. The fastener structures 70 are alike and are spaced apart along the housing 50. Each fastener structure 70 includes a fastener 72 and a brace 74.

As shown by way of example in FIG. 2, each brace 74 in the first embodiment of the invention has first and second parts 76 and 78. The first part 76 of the brace 74 is a tubular structure with a cylindrical side wall 80 centered on a longitudinal axis 81. The tubular structure 76 includes an annular retainer flange 82 and a pair of generally rectangular retainer tabs 84. The retainer flange 82 projects radially outward from a lower end 86 of the side wall 80. The retainer tabs 84 project radially outward from an upper end 88 of the side wall 80 at diametrically opposite locations.

As shown in FIG. 2, the tubular structure 76 in the first embodiment of the invention is a one-piece structure which is made from a single homogenous metal material. By "one-piece" it is meant that the tubular structure 76 is a single unit exclusive of separate but joined elements. However, the tubular structure 76 could alternatively include separate but joined elements, and materials other than metal could be used.

A plurality of axially elongated slots 92, two of which are shown in FIG. 2, extend through the side wall 80 of the tubular structure 76. The slots 92 are located between axially elongated sections 94 of the side wall 80. As described more fully below, the sections 94 of the side wall 80 are deflectable relative to each other under the influence of crash forces applied to the brace 74 by an occupant of the vehicle.

The second part 78 of the brace 74 is a short annular structure with a central aperture 95, and is received closely within the side wall 80 of the tubular structure 76 adjacent to the upper end 88 of the side wall 80. One or more welds 96 fasten the second part 78 to the side wall 80. The second part 78 is thus connected to the side wall 80 to serve as an end wall for the tubular structure 76.

Each brace 74 is received through the housing 50 in the manner shown in FIG. 1. The upper end 88 of the side wall 80 is first received through a circular opening 100 in the outer side wall 54 of the housing 50. The retainer tabs 84 are simultaneously received through a pair of diametrically opposed slots 102 that project radially outward from the opening 100. The side wall 80 of the tubular structure 76 is then moved through the opening 100 until the retainer flange 82 abuts the outer side wall 54 of the housing 50 radially outward of the opening 100 and the slots 102. When the retainer tabs 84 reach the inner side wall 52 of the housing 50, they are similarly received through a pair of slots (not shown) that project radially outward from a circular opening 104 in the inner side wall 52. The brace 74 is then rotated about the axis 81 to move the retainer tabs 84 circumferentially away from the slots in the inner side wall 52.

When the braces 74 have been received through the housing 50 in the foregoing manner, the housing 50 is placed against the roof rail 22 in the position of FIG. 1. The upper ends 88 of the side walls 80, as well as the end walls 78 and the retainer tabs 84, abut the roof rail 22. The fasteners 72 are then inserted and installed through the tubular structures 76. Specifically, each fastener 72 is a metal bolt with a head 110 adjoining the end wall 78 within the corresponding tubular structure 76. Each bolt 72 further has a screw-threaded shank 112 extending from the head 110 through the aperture 95 in the end wall 78. The shank 112 is screwed through a nut 114 which is welded to the roof rail 22.

As described above, the edge portion 32 of the head liner 24 detaches from roof rail 22 under the influence of the pressure forces developed by the inflation fluid flowing into the side curtain 12 from the conduit 60. The inflation fluid pressure forces acting on the side curtain 12 similarly urge the outer side wall 54 of the housing 50 to move away from the inner side wall 52. However, the retainer flanges 82 at the lower ends of the tubular structures 76 engage the outer side wall 54 securely enough to restrain such movement of the outer side wall 54. This enables the housing 50 to direct the inflating side curtain 12 to exit the housing 50 in a direction extending from the deployment opening 55 toward the door 16. The fastener structures 70 thus help the side curtain 12 to restrain movement of a vehicle occupant outward of the door 16 under the influence of vehicle crash forces.

Vehicle crash forces may also cause a vehicle occupant to move against the head liner 24 adjacent to the roof rail 22 above the door 16. For example, vehicle crash forces may cause an occupant's head to move against the head liner 22 adjacent to one of the tubular structures 76. Such crash forces may be great enough to cause the occupant's head to compress the head liner 24 until further movement of the occupant's head is resisted by the tubular structure 76. Therefore, in accordance with the present invention, the side wall 80 of each tubular structure 76 is weakened by the slots 92 such that the sections 94 of the side wall 80 between the slots 92 are deflectable relative to one another under the influence of vehicle crash forces applied by a vehicle occupant. This enables the tubular structure 76 to collapse axially toward the roof rail 22 and thereby to dissipate the kinetic energy of the occupant for protection of the occupant.

A second embodiment of the present invention includes alternative braces 200, one of which is shown in FIG. 3, in place of the braces 74 in the first embodiment. Each brace 200 is a one-piece tubular structure with a rectangular cross-sectional configuration. Each brace 200 thus has four orthogonal side walls 202. Each brace 200 further has four slotted corner portions 204. Like the brace 74 described above, the brace 200 is thus configured to collapse longitudinally upon deflection of the side walls 202 relative to one another under the influence of vehicle crash forces applied by a vehicle occupant.

A pair of rectangular retainer tabs 206 project outward from a corresponding pair of opposed side walls 202 at the upper end of the brace 200. The tabs 206 that project outward at the upper end of the brace 200 are configured to function in substantially the same manner as the tabs 84 (FIG. 2) that project outward at the upper end of the brace 74. Another pair of opposed tabs 208 at the upper end of the brace 200 project inward from the corresponding side walls 202. Those tabs 208 together define an end wall 210 with a central aperture 212 for receiving a fastener like the fastener 72.

The brace 200 further has four rectangular retainer tabs 214 projecting outward from the four side walls 202 at the lower end of the brace 200. The retainer tabs 214 at the lower end of the brace 200 are configured to function in substantially the same manner as the retainer flange 82 at the lower end of the brace 74.

From the above description of the invention, those skilled in the art will perceive improvements, changes and modifications. Such improvements, changes and modifications within the skill of the art are intended to be covered by the appended claims.

Having described the invention, we claim:

1. Apparatus comprising:

a relatively rigid vehicle part;

a housing containing an inflatable vehicle occupant protection device at a location between said vehicle part and a vehicle occupant compartment, said housing having a wall adjacent to said vehicle occupant compartment; and a fastener structure extending from said vehicle part to said housing wall to restrain movement of said housing wall away from said vehicle part under the influence of inflation fluid pressure forces applied by said protection device upon inflation of said protection device;

said fastener structure being configured to collapse toward said vehicle part under the influence of crash forces applied by a vehicle occupant.

2. Apparatus as defined in claim 1 wherein said fastener structure comprises a tubular structure having a plurality of longitudinally elongated slots located between longitudinally elongated sections of said tubular structure, said sections being deflectable relative to one another under the influence of said crash forces.

3. Apparatus as defined in claim 1 wherein said fastener structure includes a brace extending from said vehicle part to said housing wall and further includes a fastener fastening said brace to said vehicle part, said brace being configured to collapse toward said vehicle part under the influence of said crash forces.

4. Apparatus as defined in claim 3 wherein said brace comprises a tubular structure having an end wall adjacent to said vehicle part, said fastener having a head portion adjoining said end wall within said tubular structure, said fastener further having a shank portion extending from said head portion to said vehicle part through an aperture in said end wall.

5. Apparatus as defined in claim 4 wherein said tubular structure has a plurality of longitudinally elongated slots located between longitudinally elongated sections of said tubular structure, said sections being deflectable relative to one another under the influence of said crash forces.

6. An apparatus as defined in claim 1 wherein said fastener structure has a retainer portion engaging said housing wall on a side of said housing wall facing said vehicle occupant compartment.

7. Apparatus as defined in claim 6 wherein said fastener structure comprises a cylindrical tubular structure, said retainer portion of said fastener structure comprising an arcuate flange projecting radially from an end of said cylindrical tubular structure.

8. Apparatus as defined in claim 6 wherein said fastener structure comprises a tubular structure with a rectangular cross-sectional configuration, said retainer portion of said fastener structure comprising a retainer tab projecting from a side of said tubular structure.

9. Apparatus as defined in claim 1 wherein said relatively rigid vehicle part is a structural metal part.

10. Apparatus as defined in claim 9 wherein said structural metal part is a roof rail.

* * * * *